United States Patent Office 3,826,658
Patented July 30, 1974

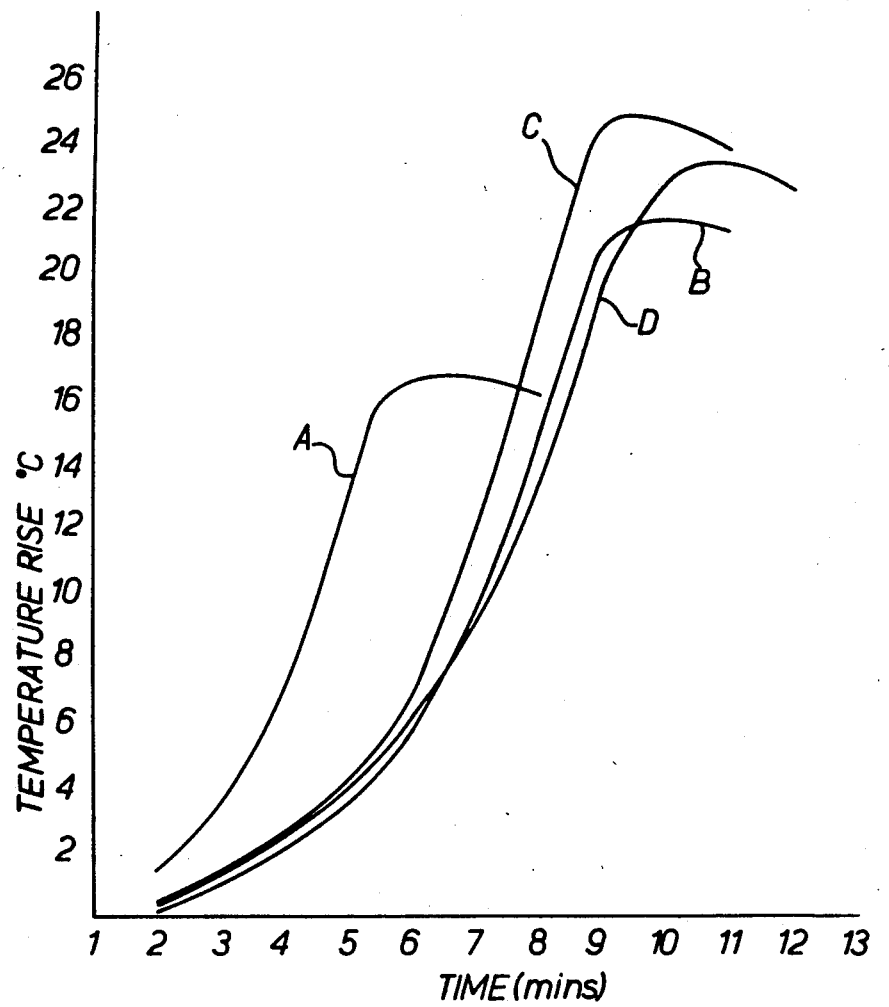

3,826,658
FOUNDRY MOULDING MATERIALS
Kenneth Ernest Lewis Nicholas, Birmingham, England, assignor to British Cast Iron Research Associates, Birmingham, England
Continuation-in-part of abandoned application Ser. No. 221,440, Jan. 27, 1972, which is a continuation of abandonded application Ser. No. 38,694, May 19, 1970. This application Mar. 26, 1973, Ser. No. 344,524
Int. Cl. B28b 7/34
U.S. Cl. 106—38.3   5 Claims

ABSTRACT OF THE DISCLOSURE

The invention provides pourable foundry moulding compositions comprising refractory filler material, water, a bonding agent and a foaming agent selected from the class of anionic alkyl sulphate foaming agents such that it produces a foam structure in the composition of an inherently limited life ensuring dispersion of the foam shortly after pouring. A first such composition disclosed and claimed comprises 100 parts of refractory filler material, from 1 to 6 parts of water, about 6 parts of sodium silicate solution as bonding agent, and about 0.1 parts of a 2-ethyl hexyl sulphate foaming agent. The composition can be made self-hardening by the addition of a hardening agent such as calcium silicate which reacts exothermically with the sodium silicate solution and evolves a gas. The free escape of the gas from the moulded composition is ensured by arranging that the early dispersion of the foam occurs, and thereby renders the composition highly permeable, before the hardening reaction commences and produces the gas.

---

This is a continuation-in-part of application Ser. No. 221,440, filed Jan. 27, 1972 and now abandoned, which in turn was a continuation of application Ser. No. 38,694, filed May 19, 1970 and now abandoned.

This invention relates to the preparation of foundry cores and moulds.

It has been proposed to produce a moulding mixture which has free-flowing properties so that it can be conveyed by the usual means of transporting liquids of fairly high viscosity, such as by pipe systems, and can therefore be poured directly into core boxes or around patterns in moulding boxes. The liquid fills the cavities of the core box or pattern without the usual need for ramming, jolting or squeezing. The liquid mixture is in the form of a stable foam and includes bonding agents so that it sets to a solid porous mass after an interval of time, to give a rigid mould or core suitable for use in the production of castings.

Such a mixture forms the subject of British Patent Specification No. 1,085,651. The foaming agent suggested is a sulphonated oil made by neutralising sulphonic acid. It is also suggested that a foam stabilising agent may be incorporated to prolong the time during which the mixture remains fluid, or a foam-quenching agent such as butyl alcohol may be incorporated to shorten this time. For bonding the mixture to cause it to set one can use known sodium or potassium silicate binders in conjunction with a hardening agent such as dicalcium silicate, gypsum or cement. Alternatively a self-hardening binder in the form of a rapid-hardening cement alone is suggested. Other such foamed pourable sand mixtures are proposed in British Patents Specifications Nos. 1,086,241 and 1,136,722 and U.S. Patent Specification No. 3,424,600, and in all cases the specifications indicated that any of a fide variety of foaming agents can be used to produce the required foam in the mixture, and the last two of these specifications indicate that a foam quenching agent may be used to control the foam structure produced.

In developing these known foamed pourable mixtures the choice of the foaming agent used in any particular composition has not been considered particularly important. The only requirements asked of a foaming agent were that it should produce a foam structure in a reliable manner and that the foam structure produced should be stable enough to permit pouring of the mixture into the moulding boxes. These basic requirements have been easily met by a wide variety of foaming agents that are commercially available and will produce a very stable foam strutcure in the different sand mixtures used to make moulds.

A disadvantage of these known mixture is that the cores and moulds made from them cannot generally be used for the manufacture of castings until they have been left to stand for some considerable time after being removed from the core and moulding boxes. Attempts to use the mould earlier can result in explosions within the mould which damage the mould and castings and allow the escape of molten metal from the mould. We have come to realise that the reason for these explosions is the stability of the foam structure in the original mixture used to make the moulds. Because the foam structure is stable it is still present in the mixture as it hardens and is thus set in the hardened mould and renders it impermeable at least while the mould is still wet. However, as the mould dries out during a standing period, the water films of the foam bubbles gradually disperse and the permeability of the mould increases. Typically, after a standing period of 12 to 24 hours the permeability of the moulds has increased sufficiently for them to be used successfully for manufacturing castings. Of course, the disadvantage of such long standing periods is that considerable storage space then has to be provided for the moulds during this stage of manufacture.

Another disadvantage which results from the initial low permeability of the aforesaid mixtures is that the mixtures cannot then include sodium silicate solution as the binder and silicon or a silicide as the hardener because these materials react together exothermically and evolve a gas which would expel the impermeable mixture from the moulding boxes. The use of conventional non-pourable foundry moulding compositions which include sodium silicate solution and a silicon or siliced hardener are known and it is recognised that they offer considerable advantages in that the exothermic reaction leads to a quicker and stronger hardening reaction and helps to dry the moulds. But because of the initial impermeable nature of the known pourable foundry moulding mixtures it has not been possible to combine the advantages of the pourable mixtures and exothermically reacting mixtures.

Yet another disadvantage of the known pourable moulding mixtures which again results from their initial low permeability, is that they cannot have carbon dioxide gas passed through them in the moulding boxes to harden them during the early stages of mould manufacture.

The purposed use of foam quenching agents does not help in overcoming any of these disadvantages. In fact we have found that the suggested foam quenching agents are undesirable in practice. Generally, the proposed foam quenching agents such as alcohols, have been found either to have no effect at all on the foam structure or to destroy the foam structure outright during mixing, thus preventing pouring of the mixture. This experience leads us to believe that foam quenching agents are most unlikely ever to have any sufficiently controllable effect as to be of real practical value.

The object of the present invention is to provide pourable foundry moulding mixtures which do not suffer from the above disadvantage Our invention is based on the appreciation of the fact that it is possible to select a single foaming agent which is so suited to the other constituents of the mixture that it will produce a foam structure with an inherently limited life ensuring dispersion of the foam structure shortly after pouring. We have found that suitable foaming agents can be selected from the class of anionic alkyl sulphate foaming agents, and in particular have found that a 2-ethyl hexyl sulphate foaming agent such as the sodium 2-ethyl hexyl sulphate sold under the trademark "Pentrone ON" will produce an inherently limited life foam structure in a mixture which includes sodium silicate solution as the binder, and that a decyl sulphate foaming agent such as the sodium decyl sulphate sold under the trademark "Pentrone DN" will produce an inherently limited life foam structure in a mixture which includes cement as the binder. The particular choice of foaming agent is critical and we will demonstrate this fact in the experimental results that follow.

In the mixture according to the invention which comprises the 2-ethyl hexyl sulphate foaming agent and sodium silicate solution as the binder, the exact time for which the foam structure lasts can be controlled as required by adjusting the ratio of the sodium silicate to water, and by adding controlled amounts of a second more stable foaming agent. By these means it is possible to arrange that the foam structure has substantially dispersed before the hardening reaction commences between the sodium silicate solution and a hardener included in the mixture. Clearly, the hardener can be a material such as calcium silicide which reacts exothermically with the sodium silicate and evolves a gas, as the gas can then escape from the highly permeable mixture.

Further, early collapse of the foam structure in both mixtures according to the invention allows them to be hardened by the passage of carbon dioxide gas through them soon after being poured into the core and moulding boxes. Gassing takes just a few minutes and then the cores and moulds can be stripped from their boxes and used shortly thereafter.

Further, even if the mixtures according to the invention are used without employing an exothermic or gas hardening reaction, the early collapse of the foam structure still helps the moulded mixture to harden and dry out more quickly and allows the escape of steam and gas from the mould once molten metal is poured into it, all of which features allows the moulds to be used sooner after the mixture is poured into the moulding boxes.

Some examples of mixtures in accordance with the invention will now be described. All the parts stated in the examples are parts by weight.

EXAMPLE I

To 100 parts of clean, washed Leighton Buzzard 21 silica sand there were added 3 parts of water, 6 parts of sodium silicate solution of specific gravity 1.375 and molecular ratio 3:1, and 0.1 part of the sodium salt of 2-ethyl hexyl sulphate sold under the trademark "Pentrone ON." Air was entrained in this mixture by a suitable mixing or stirring operation, to produce a pourable fluid slurry. To this slurry there were then added three parts of a finely ground (200 mesh) hardening agent, the preferred material being calcium silicide. The mixture was immediately cast into a flask or core box and after two or three minutes the foam collapsed, and after this time interval an exothermic reaction commenced between the sodium silicate and calcium silicide with the evolution of large volumes of hydrogen gas. As the foam collapsed the slurry lost fluidity and simultaneously the sand mass became freely permeable, permitting the free escape of the hydrogen gas to atmosphere. At normal temperatures the reaction was found to be substantially complete within 30 minutes and the sand mass was bounded throughout to form a hard body.

The concentration of water present in the sand mixture is important, affecting the time at which the exothermic reaction commences and the magnitude of the temperature rise during the reactions. The accompanying drawing is a graph showing the relationship between the temperature of the sand mixture and the time from its formation, for four different water concentrations. The mixture contains 6 parts of sodium silicate solution of specific gravity 1.375 and molecular ratio 3:1, three parts of calcium silicide and in examples A, B, C and D there are respectively 1, 3, 4 and 6 parts of water. It will be seen that the exothermic reaction commences earlier at low water concentrations (1 part addition) but in the presence of between 3 and 6 parts by weight of added water the exothermic reaction reaches higher temperatures and a strong bond is formed. In the majority of mixtures an addition of 3 parts of water produces a satisfactory reaction rate.

Calcium silicide is the preferred hardening or secondary bonding agent. The activity of this material in reaction with sodium silicate is controlled by fineness of grinding and degree of ageing. The actvity is increased by fine grinding and preferably the material should pass 200 mesh sieve. Freshly ground material is very reactive and ground calcium silicide should preferably be allowed to age for 48 hours in contact with air before use as a hardening agent for this process. It can also be used in a mixture with dicalcium silicate as hardening agent for sand mixtures containing sodium silicate, the speed of the reaction being dependent on the relative proportions of the more or less reactive ingredients.

Metallurgical slags and residues from processes such as basic cupola operations, basic open hearth furnaces, ferro-chromium production and Pidgeon process for magnesium production are convenient sources of dicalcium silicate. Portland cement and blast furnace slag cement also contain this mineral and can be used in any combination with calcium silicide, for the purpose of this invention, depending on the rate of reaction required.

The use of a mixture of dicalcium silicate and calcium silicide has the advantage of economising in the use of calcium silicide, but the hardening reaction is retarded. An example of a mixture using these materials is as follows:

EXAMPLE II

To 100 parts of clean-washed Leighton Buzzard 21 sand were added 3 parts of water, 6 parts of sodium silicate solution (specific gravity 1.375, molecular ratio 3:1) and 0.1 part of "Pentrone ON." In a suitable mixing operation air was entrained in this sand mass and resulted in the production of a fluid slurry. 5 parts of dicalcium silicate (ground to —200 mesh) and 1 part of calcium silicide (ground —200 mesh) were mixed and then added to the slurry with further mixing to obtain a uniform dispersion. The mixture was cast into a flask or core box and the air/water foam structure dispersed after 2 minutes. The subsequent reaction between the sodium silicate binder and the dicalcium silicate hardener resulted in a strongly bonded sand mass being obtained in about ninety minutes.

In sodium silicate bonded sand mixtures of the type described above the duration of a stable air-water foam structure depends upon the proportions of the sodium silicate solution and added water present.

By changing the proportion of sodium silicate solution and water, collapse of the foam can be controlled to ensure that it precedes the commencement of chemical hardening reactions. For example, air-water foams obtained by the addition of "Pentrone ON" to sand mixtures collapsed at the following times depending upon the relative concentration of sodium silicate solution and water present:

With 6 parts sodium silicate solution, 4 parts water, the foam dispersed 2 minutes 20 seconds after mixing.
With 6 parts sodium silicate solution to 2 parts water, the foam dispersed 8 minutes after mixing.
With 6 parts sodium silicate solution to 1 part water, the foam dispersed 13 minutes after mixing.

Another method of controlling the time at which the air-water foam collapses is to use mixtures of compatible foaming agents to generate the foam structure. For example, the addition of anionic alkyl aryl sulphonates of the type known by the trademark "Teepol 514" to "Pentrone ON" will increase the stability of the foam structure.

In mixes containing 6 parts sodium silicate (specific gravity 1.375, molecular ratio 3:1), 2 parts of water and 0.1 part "Pentrone ON" the life of the air-water foam was prolonged by the addition of "Teepol 514" in the following manner:

Using 0.1 part "Pentrone ON" and 0.0025 part of "Teepol 514," the foam lasted for 20 minutes.
Using 0.1 part "Pentrone ON" and 0.005 part of "Teepol 514," the foam lasted for 24 minutes.
Using 0.1 part "Pentrone ON" and 0.010 part "Teepol 514," the foam lasted in excess of 30 minutes.

In another test, using another secondary foam stabilizer, in the form of a diethanolamide sold under the trademark "Trisophone PK" instead of "Teepol 514" the following results were obtained:

Using 0.1 part of "Pentrone ON" and 0.005 part of "Trisophone PK," the foam lasted 7½ minutes. Doubling the amount of the "Trisophone PK" made the foam last 20 minutes, and with four times as much "Trisophone PK" (but still the same amount of "Pentrone ON") the foam life was in excess of 30 minutes.

As in the known arrangements, silicon alone, in the form of finely ground ferrosilicon or silicon metal, or a silicide, may be used as the hardener for the sodium silicate. This reaction is accompanied by the formation of large quantities of hydrogen gas, which cannot escape freely unless the air/water foam has completely dispersed throughout the sand mass after pouring and before the reaction commences.

EXAMPLE III

This is an example of the use of the carbon dioxide curing process, made possible by the fact that the limited life of the foam allows the mixture to be gassed after pouring. A mixture was made up as follows:

|   | Parts |
|---|---|
| Sand (Leighton Buzzard No. 21 silica sand) | 100 |
| Sodium silicate (specific gravity 1.375, molecular ratio 3:1) | 6 |
| Water | 2 |
| Foaming agent ("Pentrone ON") | 0.1 |

Air was entrained in the mixture by a suitable mixing operation and the resulting fluid slurry was cast around a pattern in a foundry moulding flask. The foam collapsed after three minutes.

Carbon dioxide gas was then passed through the resulting gas-permeable body; the volume of the sand mixture was one litre and eight litres of gas were passed through it in 1 minute. The compressive strength of the mass immediately after the gassing treatment was found to be 88 lb. per square inch (6.2 kg./sq. cm.). This rapid development of the strength allowed immediate stripping of the pattern, so reducing the time for which the pattern was occupied, and it also allowed the mould to be used for casting metal within a short space of time.

EXAMPLE IV

In this example use is made of a rapid-hardening portland cement as the binder instead of sodium silicate, and it was hardened by gassing with carbon dioxide. Cement has been used in known arrangements but has previously simply been hardened by the normal cement-water reaction and has been too slow for commercial use in foundries. By the use of a foaming agent giving a foam of limited life we allow the use of the gassing technique and, applying this to the cement, we achieve a very rapid setting action. A mixture was made up as follows:

|   | Parts |
|---|---|
| Sand (Leighton Buzzard No. 21 silica sand) | 100 |
| Portland cement ("Swiftcrete" rapid-setting, specific surface 7,500 cm./gm.) | 10 |
| Water | 6 |
| Foaming agent ("Pentrone DN") | 0.1 |

Pentrone DN is the sodium salt of decyl sulphate. The mixture was poured into a core box to form a core weighing 80 lb. The foam dispersed within two minutes, and then 4.3 cubic feet of carbon dioxide gas were passed through the mass which became hard within 2 minutes. The temperature within the core rose 25° C. and the strength developed was sufficient to permit immediate stripping. After 24 hours curing at room temperature, this core had a compressive strength of 155 lb./in.$^2$ and was used in the production of an iron casting weighing 780 lb. which was poured at 1,300° C. When cold the core broke down readily.

Cores made from a similar sand/cement/water mixture but without treatment with $CO_2$ gas developed a strength of only 108 lb./in.$^2$ under similar conditions. Due to the slower rate of hardening, such a core could not be stripped from the forming box in less than 4 hours.

It will be seen that in each of the above four examples the foaming agent used is an anionic alkyl sulphate which gives a foam with a limited life without the need for foam-quenching agents and allows the mould or core to become permeable before the binder sets either with the evolution of gas or by the use of gas. In all cases the foam collapsed within just a few minutes and the material then sets within a relatively short time.

The following comparative tests clearly demonstrate the difference in permeability between a mixture according to the invention and a conventional pourable foundry moulding mixture.

A conventional mixture was prepared by mixing 100 parts Leighton Buzzard 21 silica sand, 6 parts sodium silicate solution (S.G. 1.375, molecular ratio 3:1), 1.5 parts water and 0.1 part "Teepol 514." A foamed pourable mixture was obtained within 45 seconds and 3 parts of dicalcium silicate were added and mixed in for a further 45 seconds. The mixture was then poured into patterns to form standard cylindrical 2 inch x 2 inch American Foundryman Society (A.F.S.) specimens which had their permeability tested at set intervals on a Ridsdale-Dietert Electric permeter.

A mixture according to the invention was also prepared in the same way and with the same constituents as the conventional mixture except that "Pentrone ON" was used in place of "Teepol 514." A.F.S. specimens were formed from the mixture and permeability measurements were made in the same way as for the conventional mixture.

The permeability figures obtained with both mixtures were as follows:

| Hours after pouring | 1 | 2 | 3 | 4 | 5 | 19 | 24 | 48 |
|---|---|---|---|---|---|---|---|---|
| Average A.F.S. permeability number {Conventional mixture (with "Teepol 514"). | 6 |  | 15 |  |  | 23 | 45 | 73 | 400 |
| Mixture of invention (with "Pentrone ON"). | 715 | 900 |  | 910 | 910 |  |  |  |

These results clearly demonstrate how in contrast to the known mixtures those according to the invention produce a foam structure which disperses very rapidly after pouring, thereby giving a highly permeable mould. The minimum acceptable permeability for a mould made from a synthetic chemically bonded sand is about 100 A.F.S. permeability number, and thus moulds made from the conventional mixture could not be used in the manufacture of castings for at least 24 hours after pouring whereas moulds made from the mixtures according to the invention can be used as soon as the moulds are hard enough.

Similar comparative tests can be conducted using pourable cement bonded composition to show that the cement bonded mixture including a decyl sulphate foaming agent is unique in producing a foam structure with an inherently limited life.

Further, the fact that the particular choice of anionic alkyl sulphate foaming agent is critical in the two mixtures according to the invention, can be demonstrated by using other alkyl sulphate agents in place of those specified and observing the results. This was done using a basic mixture comprising 100 parts Leighton Buzzard 21 silica sand, 6 parts sodium silicate solution, 3 parts dicalcium silicate, 2 parts water and 0.1 part of a selected anionic alkyl sulphate foaming agent. To begin with using the sodium 2-ethyl hexyl sulphate "Pentrone ON" according to the invention a mixture was obtained which one hour after pouring had a measured A.F.S. permeability number of 950. However, when using sodium hexyl sulphate as the foaming agent a foamed structure could not be produced at all in the mixture, when using sodium heptyl sulphate as the foaming agent a foamed structure could be produced but this collapsed within just a few seconds after mixing ceased and did not therefore allow sufficient time for pouring, and when using sodium n-octyl sulphate or any alkyl sulphate with more than eight carbon atoms in the radical a very stable foam structure was produced. For example, the mixture including sodium nonyl sulphate as the foaming agent has a measured A.F.S. permeability number of 16 one hour after pouring, the mixture including sodium decyl sulphate ("Pentrone DN") as the foaming agent has a measured A.F.S. permeability number of 7 one hour after pouring, and the mixture including sodium undecyl sulphate as the foaming agent had a measured A.F.S. permeability number of 3 one hour after pouring. These results clearly indicate that only the 2-ethyl hexyl sulphate foaming agent produces a foam structure which will allow pouring but will disperse within a short time thereafter.

To further demonstrate that only the 2-ethyl hexyl sulphate foaming agent in the above basic mixture will bring about dispersion of the foam structure to allow the escape of gas from the mixture, all of the tests can be repeated using calcium silicide in place of dicalcium silicate as the hardener. This reacts exothermically with the sodium silicate solution producing hydrogen gas. Only the mixture including "Pentrone ON" as the foaming agent allowed the hydrogen to escape freely. With all of the other foaming agents that produced a foam structure the hydrogen gas could not escape freely from the mixture and instead the mixture expanded and was ejected from the patterns.

Tests can also be carried out using a cement bonded mixture in which different alkyl sulphate foaming agents are used. This has been done using a basic mixture comprising 100 parts Leighton Buzzard 21 silica sand, 10 parts portland cement ("Swiftcrete"), 6 parts water, and 0.1 part of an alkyl sulphate foaming agent. Using the sodium decyl sulphate ("Pentrone DN") according to the invention, a foam structure was produced which could be seen to have dispersed 1½ minutes after pouring. However, sodium octyl sulphate and sodium nonyl sulphate failed to produce a foam at all, and sodium undecyl sulphate and sodium lauryl sulphate produced a very stiff foamed mixture but foaming was not sufficient to make the mixture fluid or pourable. Thus, only the decyl sulphate produced a useful mixture at all.

What is claimed is:

1. A pourable fluid composition for use in casting foundry moulds and cores comprising 100 parts of refractory filler material from 1 to 6 parts of water, about 6 parts of sodium silicate solution as bonding agent, and about 0.1 part of a 2-ethyl hexyl sulphate foaming agent.

2. A composition as claimed in claim 1 including a hardening agent comprising about 3 parts of calcium silicide.

3. A composition as claimed in claim 1 including a hardening agent comprising a mixture of 1 part of calcium silicide to 5 parts of di-calcium silicate.

4. A pourable self-hardening composition for use in foundry cores and moulds comprising 100 parts of refractory filler material, about 1 to 6 parts of water, about 6 parts of a sodium silicate solution of specific gravity 1.375 and a molecular ratio 3:1, about 0.1 part of a sodium salt of 2-ethyl hexyl sulphate as foaming agent, and about 3 parts of calcium silicide as a hardening agent for said sodium silicate.

5. A pourable fluid gas-hardening composition for use in casting foundry cores and moulds comprising 100 parts of refractory filler material, about 2 parts of water, about 6 parts of a sodium silicate solution of specific gravity 1.375 and a molecular ratio 3:1, and 0.1 part of a sodium salt of 2-ethyl hexyl sulphate as foaming agent.

References Cited

UNITED STATES PATENTS

| | | | |
|---|---|---|---|
| 2,240,622 | 5/1941 | Lawson | 106—90 |
| 3,150,989 | 9/1964 | Parson | 106—75 |
| 3,424,600 | 1/1969 | Liass | 106—38.35 |
| 3,600,203 | 8/1971 | Aldera | 106—38.35 |

FOREIGN PATENTS

| | | | |
|---|---|---|---|
| 1,086,241 | 10/1967 | Great Britain | 106—38.35 |

LORENZO B. HAYES, Primary Examiner

U.S. Cl. X.R.

106—38.35, 38.9, 69, 74, 84, 90, 98